United States Patent [19]
Fukuda et al.

[11] 3,981,749
[45] Sept. 21, 1976

[54] GAS DIFFUSION ELECTRODE FOR A BATTERY

[75] Inventors: Masataro Fukuda, Takatsuki; Tsutomu Iwaki, Kyoto; Hiroshi Kawano, Hirakata, all of Japan

[73] Assignee: Matsushita Electric Industrial Co., Ltd., Osaka, Japan

[22] Filed: Sept. 12, 1973

[21] Appl. No.: 396,558

Related U.S. Application Data

[63] Continuation of Ser. No. 174,137, Aug. 23, 1971, abandoned, which is a continuation of Ser. No. 686,043, Nov. 28, 1967, abandoned.

[30] Foreign Application Priority Data

Nov. 30, 1966 Japan .............................. 41-79022

[52] U.S. Cl. .................................... 429/41; 429/42; 429/45
[51] Int. Cl. ......................................... H01m 13/00
[58] Field of Search .............. 136/120 FC, 121, 122, 136/86 D, 120 R

[56] References Cited
UNITED STATES PATENTS

| | | |
|---|---|---|
| 3,311,505 | 3/1967 | Paget et al. ................ 136/120 FC X |
| 3,423,247 | 1/1969 | Darland, Jr. et al. .......... 136/120 FC |
| 3,432,355 | 3/1969 | Niedrach et al. ................. 136/86 D |
| 3,480,538 | 11/1969 | Sturm ....................... 136/120 FC X |
| 3,513,029 | 5/1970 | Giner ....................... 136/120 FC X |
| 3,591,421 | 7/1971 | Schultze et al. .............. 136/120 FC |

*Primary Examiner*—Anthony Skapars
*Attorney, Agent, or Firm*—Stevens, Davis, Miller & Mosher

[57] ABSTRACT

This specification discloses a gas diffusion electrode for a battery, wherein a layer which is formed of a binding agent and substance such as graphite, nickel oxide, aluminum oxide or the like so as to represent no catalytic action with respect to a fuel is provided on the electrolyte side of a high-porosity sintered member of which the constituent is nickel, thereby preventing a decrease in the electrode potential due to the active fuel and in the utilization rate of such fuel, while at the same time restraining permeation of a gas supplied to the electrode into the electrolyte and leakage of such electrolyte into the gas.

6 Claims, 3 Drawing Figures

ELECTROLYTE    GAS

GAS DIFFUSION ELECTRODE FOR A BATTERY

This is a continuation of U.S. application Ser. No. 174,137 filed Aug. 23, 1971, which is a continuation of U.S. application Ser. No. 686,043, filed Nov. 28, 1967, both of which are abandoned.

This invention relates to a gas diffusion electrode for a battery, and more particularly it pertains to such electrodes comprising a layer which is formed of a substance such as carbon, aluminum oxide, nickel oxide or the like and a binding agent such as polyethylene, polystyrene, fluorocarbon resin or the like so as to represent no catalytic action with respect to a fuel, said layer being provided on the electrolyte side surface of a high-porosity sintered member.

Recently, gas diffusion electrodes have found extensive use in so-called low-temperature fuel cells adpated for operation at a temperature not higher than 100°C., such as rechargable air-zinc batteries which have recently come to attract public attention, etc. That is, in these batteries, a gas such as hydrogen, propane or the like serving as fuel, and oxygen serving as an oxidizer are supplied from one of the electrode sides, and an electrolyte is provided in the other electrode side, so that an electrochemical reaction is caused in a so-called three phase zone. Recently, there is a growing tendency that with economy and maintenance taken into consideration, oxygen contained in the air is utilized as the oxidizer not only for a gaseous fuel cell using hydrogen but also for a liquid fuel cell using methanol, hydrazine or the like. Thus, it has become one of the most important matters to improve the performance and life of the gas diffusion electrodes.

In the prior art, use was made of porous carbon or metal electrodes as such gas diffusion electrodes.

The carbon electrodes herein refer to so-called baked electrodes formed by baking carbon powder such as graphite, active carbon or the like together with a binding agent such as tar, pitch or the like, or non-baked electrodes formed by pressure-molding such a mixture of the carbon powder and binding agent having a synthetic resin such as polystyrene added thereto. Such electrodes are subjected to water-proofing with paraffin, fluorocarbon resin or the like.

These electrodes are used as oxide electrodes as such or with silver, platinum or the like serving as a catalyst added thereto in the case where the main constituent is active carbon, and in the case where the main constituent is graphite, they are used with silver, platinum or the like added thereto. In the cases where such an electrode is used as a fuel electrode, such as a hydrogen electrode, hydrocarbon electrode or the like, use is usually made of a platinum group metal such as platinum, palladium or the like as the catalyst.

On the other hand, among the metal electrodes are a sintered electrode formed by sintering powder of nickel, silver or the like, an electrode formed of a Raney metal such as Raney nickel, Raney silver or the like, and an electrode formed by a screen of nickel, platinum or the like having a catalyst added thereto.

In general, a carbon electrode has such an advantage that a great reaction area can be secured due to the properties of its constituent powder, but it is somewhat poor in respect to electric conductivity and mechanical strength. Therefore, the conventional carbon electrode has such drawbacks that polarization is excessively caused by a high-current discharge, and that it lacks adaptability for miniaturization of a cell since it is difficult to produce such electrode of a desired thickness, especially a thin one. In an attempt to eliminate such drawbacks, a proposal has been made to use a support member.

A sintered metal electrode is advantageous in that it has an increased electric conductivity and mechanical strength so that it can be configured relatively easily into a desired thickness and size. However, it has the drawback of leakage of the electrolyte into the gas, which constitutes one of the most critical problems with a gas diffusion electrode. In an attempt to solve such problem, in the prior art, use has been made of such a system that the porosity of the electrode is made as low as, for example 40% to 60%, the pores are made as small as possible and the gas side of the electrode is pressurized by increasing the pressure of the gas in use such as oxygen, hydrogen or the like. In accordance with such a system, however, in the case of a practical layer-built cell consisting of a large number of unit cells, it is very difficult to maintain the balance between the gas and the electrolyte on each portion of the electrode surface in each unit cell and also between the respective unit cells. In case use is made of air which is often utilized recently, the necessity arises for performing a special pressurizing operation. In addition, in such a case, efficient discharge is impossible since even if air is supplied while being pressurized, the nitrogen gas remaining after the oxygen gas in the air has been completely consumed cannot be sufficiently removed from the electrode due to the fact that the porosity of the electrode per se is low and the pores therein are small.

On the other hand, the electrode formed of a Raney metal has an improved discharge performance, but the method of manufacturing it is very complicated, and the use of such a type of electrode formed by adding a catalyst to a screen is limited to special cells such as an ion-exchange membrane fuel cell and the like using a smaller quantity of electrolyte.

In view of the foregoing, the present inventors have already shown in the copending U.S. Pat. application Ser. No. 620,791 filed on Mar. 6, 1967 that a good result can be obtained by subjecting a high-porosity metal electrode consisting of a sintered substance of which the main constituent is nickel containing active carbon, silver, platinum, palladium or the like serving as a catalyst to water-proofing by the conventional method and by reducing leakage resulting from high-rate porosity by depositing fluorocarbon resin powder on the gas side of the electrode. Thus, it is possible to produce a gas diffusion electrode with a high-rate discharge and long life, without applying a high pressure to the gas side of the electrode, or in some cases by utilizing natural diffusion of the air without resorting to any special pressurizing means.

The basic structure of a fuel cell is such that a fuel electrode and an oxidizer electrode are disposed in opposing relationship with each other, and that an electrolyte is filled between the electrodes. In the cases where gases are used for both the fuel and the oxidizer as in the oxygen-hydrogen fuel cell, use is made of such a structure that oxygen and hydrogen are separately supplied to the gas electrode. In the case of a cell using a liquid fuel such as methanol, hydrazine or the like dissolved in an electrolyte, only the oxidizer electrode takes the form of a gas electrode, while the fuel electrode is immersed in the solution when used. Naturally, in principle, it is not desired that the fuel and oxidizer reach other electrodes than the electrode to which they are to be supplied, respectively.

In a gas fuel cell such as an oxygen-hydrogen fuel cell, for example, if the hydrogen gas reaches the oxidizer electrode or if the oxygen gas reaches the hydrogen electrode, it may happen that either of the electrodes represent a potential based on a mixture of oxygen and hydrogen, so that there occurs increasing polarization and also there arises the danger of explosion of such a mixture.

In a liquid fuel cell using a liquid fuel such as methanol, ethanol, hydrazine or the like dissolved in an electrolyte, the oxidizer electrode is also exposed to the fuel required for the fuel electrode, unless special means such as a separator or the like is interposed between the electrodes. In case methanol or ethanol is used as fuel, the oxidizer electrode may be a carbon electrode or one formed of sintered nickel with silver added thereto as a catalyst, since both methanol and ethanol represent inertness with respect to any of carbon, silver and nickel. In such a case, therefore, there occurs no decrease in the potential at the oxidizer electrode and in the utilization rate of such alcohol. A proposal has been made of attempting to passivate the carbon electrode serving as the oxidizer electrode by rapidly cooling the electrode from an elevated temperature down to a low temperature in the process of manufacture. But, for the foregoing reason, no practical problem will arise even if no such treatment is effected. On the other hand, in case use is made of a very active fuel such as hydrazine, sodium borohydride, formalin or the like, the fuel is subjected to contact cracking not only by silver or nickel but also by carbon, which contains as excessive quantity of impurity or is too active, if the electrolyte containing such fuel contacts the oxidizer electrode, thus causing a wasteful consumption of fuel and a decrease in potential. Consequently, the utilization rate of the fuel decreases, and in addition the terminal voltage of the cell drops. In the cases where any of the fuels described above are used, it is most preferable to use an electrode formed of only carbon of a very high purity and not too active as the oxidizer electrode. Unfortunately, however, such an electrode generally has poor ability as an oxidizer electrode. Thus, it is difficult for such electrode to possess a long life under conditions of high-rate discharge. In order to eliminate such difficulty, consider the already proposed passivation method in which an oxidizer is formed by quickly cooling a carbon electrode heated to a high temperature so as to passivate it. The resulting passivated layer is described as being inert with respect to ethanol. It is required that the electrolyte reach that portion of the carbon electrode which acts as an oxidizer pole, since a so-called three phase zone should be defined in said portion of the carbon electrode. It is not possible that the passivated layer passes only the electrolyte and not methanol therethrough. That is, (1) the passivated layer is inert with respect to ethanol, (2) electrolyte is required for the essential electro-chemical reaction of the carbon electrode, and (3) ethanol also reaches said portion of the carbon electrode together with the electrolyte. From these, it will be seen that in this method, the passivated layer must represent catalytic action at least as an oxidizer electrode. From the same point of view as here above, consider the electrode of this invention of which the main constituent is nickel. First of all, it may be thought to form nickel oxide on the surface of the electrode in order to deactivate the main constituent or nickel with respect to the fuel. In this way, it is surely possible to deactivate nickel oxide with respect to the fuel, but both nickel and nickel oxide represent an extremely small electro-chemical catalytic action with respect to the fuel or oxidizer irrespective of their passivation. This means that the essential function of a gas electrode cannot be achieved. Thus, it is not possible that in case an added catalyst such as silver, platinum, palladium, or active carbon is passivated, such catalyst represents a catalytic action as oxidizer electrode while being deactivated with respect to the fuel. (It is only natural that the deactivated fuel electrode would not achieve its own essential function.)

As will be seen from what has been described above, it is impossible that an electrode of which the main constituent is nickel can be subjected to such passivation as proposed. Thus, it may be considered to use an electrode having such a drawback that it is active with respect to hydrazine or the like but being provided with a means for preventing hydrazine or the like from contacting the surface of the electrode as surely as possible. Such means may be a separator such as an ion-exchange membrane, a semipermeable membrane or the like to isolate the fuel electrode and the oxidizer electrode from each other. In this way, it is possible to prevent hydrazine from reaching the oxidizer electrode. In this case, preferably, an electrolyte containing no such a fuel as hydrazine or the like is always supplied to the liquid side of the oxidizer electrode. However, it has been found that this method has the following great disadvantages. That is, (1) it is necessary to consider the life of the separator. (2) driving means, a liquid container, a liquid feed pipe, etc. are additionally needed to supply the liquid to the oxidizer electrode, and (3) the cell becomes correspondingly large-sized. In addition to these disadvantages observed on the basis of a unit cell, a practical layer-built cell comprising a number of unit cells has also such great disadvantages that the balance between the liquid supply to the oxidizer electrode and that to the fuel electrode tends to be distrubed so that such liquid supplies cannot be smoothly effected, and that difficulties are experienced in the maintenance thereof.

It is a primary object of this invention to provide a method of manufacturing an oxidizer electrode for a system in which it is undesirable for the fuel to reach the oxidizer electrode directly, especially for a cell using an active fuel such as hydrazine, thereby preventing a decrease in the utilization rate of the fuel and in the potential at the oxidizer electrode. The gas electrode for the electrode is formed mainly of a high porosity sintered material of which the main constituent is nickel as described above. The high porosity sintered material may be either one having active carbon added thereto during the sintering operation or one having silver, palladium or the like added thereto after it has been sintered with, preferably, nickel mixed active carbon and thereafter subjected to water-proofing. On the electrolyte side of the electrode is provided a layer for diminishing the fuel reaching the electrode. In addition to the requirement that the fuel reaching the reaction portion of the oxidizer electrode should be diminished, the requirements for such layer are: (1) it should be inactive with respect to the fuel such as hydrazine or the like. (2) it should have no adverse effect on the waterproof effect of the oxidizer electrode, (3) it should be rigidly attached to the oxidizer electrode so that it will never be peeled off or removed during the operation, and (4) the gas electrode should not be greatly polarized. If all such requirements can be met, then a solution having polystyrene, polyethylene, fluorocarbon resin or the like dissolved or dispersed therein is added to powder of carbon, especially graphite, nickel oxide produced at a high temperature, aluminum oxide or the like, and the resultant mixture is adhered to the liquid side of the gas electrode by a suitable method such as painting, spraying or the like. Powder of graphite or the like is substantially inactive with respect to the fuel. Thus, by providing such powder bound with said resin on the liquid side of the oxidizing electrode, it is possible to minimize the adverse effect of hydrazine or the like. However, the function of a gas electrode is produced by the layer of which the main constituent is nickel, because the layer of said powder has no catalytic ability with respect to oxygen. That is, it is required that the electrolyte reach the reaction portion of the electrodes. This also implies that there may be a possibility that the fuel such as hydrazine or the like reaches said reaction portion at the same time. From this, it will be seen that this layer serves not to passivate the reaction surfaces of the electrodes but to diminish hydrazine or the like reaching the reaction portion described above. In order that such diminution may be achieved and the polarization of the gas electrode may be minimized by providing the aforementioned layer, it is required that the grain diameter of the powder to be used such as graphite, nickel oxide or the like and the quantity of the binding agent to be added such as fluorocarbon resin be properly selected. That is, the grain diameter of the powder is preferably about several microns to 40 microns. If the grain diameter is too small, some difficulties will be encountered in the attempt to form a rigid layer, whereas if it is too large, not only the formation of such a rigid layer will become difficult but also the effect of restraint will become poor. The suitable quantity of a binding agent to be added may be about 10% to 40% with respect to that of said powder, in the case where use is made of fluorocarbon resin powder which is the most excellent binding agent. By satisfying such conditions, it is possible to maximize the restraint effect and minimize the polarization.

The reason why graphite or the like is used on that side of the gas electrode which is associated with the liquid as described above is that in case a small quantity of polystyrene, polyethylene, fluorocarbon resin or the like is merely applied, it is almost impossible to prevent the fuel from reaching the electrode which if such quantity is increased the voltage drop (IR) across the electrode tends to increase and it is difficult to determine the quantity such that the increase in the voltage drop and adverse effect of the fuel can be diminshed. From this, it will be seen that graphite or the like serves as a sort of buffer agent which is adapted to restrain the polarization of the electrode and diminish arrival of the fuel.

Furthermore, such a layer provided on the liquid side serves to diminish the danger of explosion due to the contact of the gas produced by the associated electrode with the electrode when the layer is used as a gas electrode of an oxygen-hydrogen fuel cell for example, since the catalyst surface of the electrode is not directly exposed to the electrolyte. This layer also serves as water-proofing medium to diminish liquid leakage. Thus, such layer can be effectively used for the gas electrode of the other cells. In the case where a pressure gas is supplied to the gas side of a gas electrode, the resulting electrode can be used as the gas electrode as it is. However, in the case where the gas pressure is lower or it should be equilibrium with respect to the atmospheric pressure, it is preferable to adhere fluorocarbon resin powder such as 4-6 fluorocarbon resin powder (a tetrafluoroethylene-hexafluoropropylene copolymer) to the gas side to restrain liquid leakage and diminish the gas side from being wetted according to the method of application previously filed.

Other objects, features and advantages of this invention will become apparent from the following description taken in conjunction with the accompanying drawings, in which.

EXAMPLE 1

In this example, this invention was applied to the air electrode of an air-methanol fuel cell.

Figure 1:
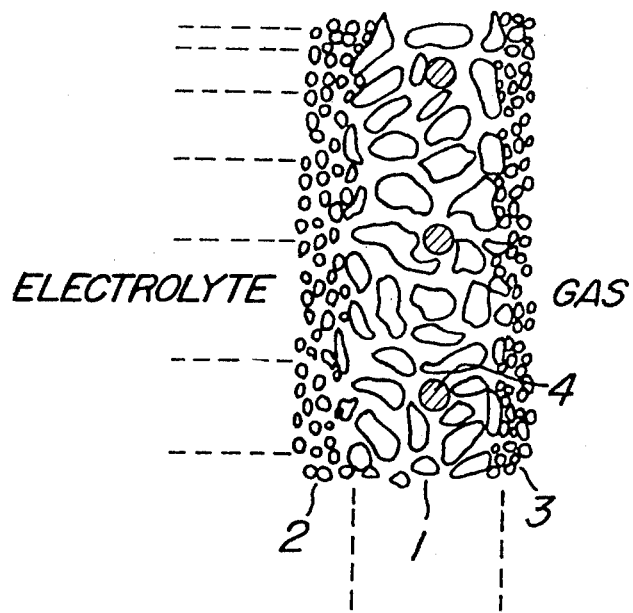
FIG. 1 is a sectional view of the electrode according to an embodiment of this invention.

The main body of the gas diffusion electrode was formed of a sintered substance which was produced by sintering a uniform mixture of 92.5% of grade A carbonil nickel and 7.5% of active carbon. The thickness was about 1 mm, and the porosity was about 82%. By any conventional method, about 10 mg/cm$^2$ of silver was added as catalyst. Furthermore, the main body was subjected to water-proofing with a fluorocarbon resin emulsion. Thereafter, a double quantity (weight) of methyl alcohol was uniformly mingled with and dispersed in a mixture of graphite powder (80%) and polyfluorocarbon resin powder (20%), and the resultant mixture was uniformly applied on the electrolyte side of the resulting electrode in the amount of 10–15 mg/cm$^2$ as it was dried. The applied mixture was dried at 30°–60°C., and then it was subjected to a heat treatment at 340°C./hr. in a nitrogen flow. Thereafter, the electrode was fixedly adhered to a battery jar, and powder of 4-fluorine-6fluoropolyethylene was applied on the air side of the electrode at a rate of about 5 mg/cm$^2$. FIG. 1 is a schematic sectional view of the resulting air electrode, which comprises a central layer 1 formed of the sintered substance of which the main constituent is nickel having silver and a water-proofing agent added thereto, a layer 2 formed of graphite and polyfluorocarbon resin provided on the liquid side, and a layer 3 formed of fluorocarbon resin powder provided on the gas side. A nickel screen 4 is inserted in the sintered body. In the methanol fuel cell, the layer 1 serves as an oxygen electrode, and the layers 2 and 3 serve to reduce leakage of the electrolyte to the gas side in this example.

Figure 2:
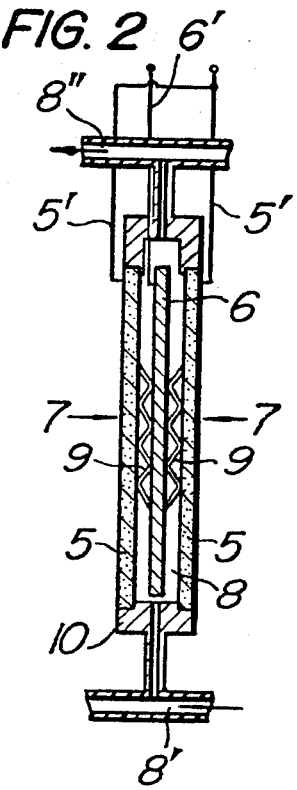
FIG. 2 is a sectional view of a battery using the electrode as shown in FIG. 1.

FIG. 2 shows a cell using the electrode described above. In FIG. 2, the reference numeral 5 represents an air electrode, which is arranged as shown in FIG. 1. The reference numeral 5' denotes a lead plate for the air electrode 5, the lead plate being preferably formed of a thin nickel plate, 6 a methanol electrode formed of a well known sintered nickel body having platinum added thereto as catalyst, and 6' a lead plate for the methanol electrode. The air is supplied as indicated at 7. The fuel was 30% potassium hydroxide containing 15% of methanol. Such fuel is supplied along the path $8' \rightarrow 8 \rightarrow 8''$. The reference numeral 9 represents a separator isolating the electrodes, and 10 a battery jar.

For comparison, a cell $(A)_1$ using the electrode according to this invention and a cell $(B)_2$ using an electrode which is not provided with the layer 2 as shown in FIG. 1 were continuously discharged with a current density of 18 mA/cm$^2$ at room temperature. The result was that in either cell, the potential was slightly poor at the initial stage of the discharge but a steady state value was reached in several days. Both cells have discharged for 450 days and are still discharging, and their potentials fall within the range of −0.12 to 0.14 V, with a mercury oxide electrode as reference electrode. Little or no liquid leakage occurred at the initial stage of the discharge, but it gradually increased for about 150 days and thereafter a steady state was reached. The steady state value of the cell $(A)_1$ was $5 \sim 7 \times 10^{-4}$ cc/hr. cm$^2$ (electrode area), and that of the cell $(B)_1$ was $2 \sim 4 \times 10^{-3}$ cc/hr. cm$^2$. In either case, the liquid leakage is so small that no practical problem arises. The liquid leakage in the cell $(A)_1$ is about one-fifth of that in cell $(B)_1$.

From the foregoing example, it will be noted that the layer of carbon and polyfluorocarbon resin provided on the liquid side is adapted to effectively diminish liquid leakage. Description will now be made of the case where the electrode of this invention was used as the air electrode of an air-hydrazine fuel cell to diminish a decrease in the utilization rate of an active fuel and the appearance of a mixed potential, which constitutes the most important object of the layer described above.

EXAMPLE 2

Figure 3:
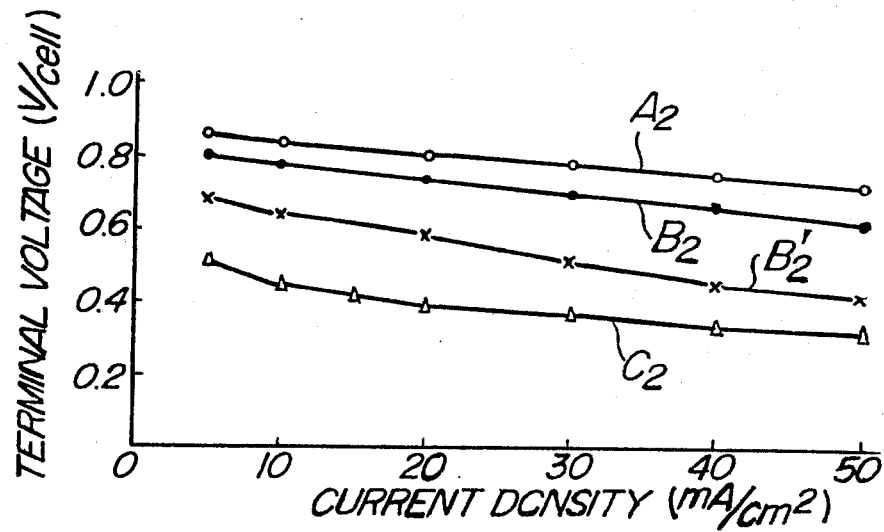
FIG. 3 shows discharge performance.

Methyl alcohol was added to a mixture of grade A carbonyl nickel (97.5) and acetylene black (2.5) and sufficiently mixed therewith until the resulting mixture represented a muddy state. After being completely dried, the muddy mixture was sintered by any conventional method. Thus, the main body of the gas diffusion electrode was formed of the resulting sintered material. The thickness was about 1.2 mm, and the porosity was about 81%. About 50 mg/cm$^2$ of silver was then added to the main body as catalyst by any conventional method. The electrode was subjected to water-proofing with an emulsion of polyfluorocarbon resin, and it was again subjected to a heat treatment at 350°C. for 1 hour. Thereafter, a double quantity of methyl alcohol was uniformly mingled with and dispersed in a mixture of nickel oxide powder (82%) and polyfluorocarbon resin powder (18%), and the resultant mixture was uniformly applied on the electrolyte side of the resulting electrode in the amount of 15–40 mg/cm$^2$. The electrode was subjected to a heat treatment at 350°C. for 1 hour. The atmosphere for each heat treatment described above may be nitrogen. The electrode thus formed had 4–6 fluorocarbon resin powder uniformly applied on the gas side thereof at a rate of about 4 mg/cm$^2$. Then, the electrode was heated in a nitrogen flow at 220°C. for 30 minutes, and thereafter it was fixed in the battery jar. A sectional view of the electrode is similar to FIG. 1, and its mixture layer of nickel oxide and polyfluorocarbon resin corresponds to the layer 2 of FIG. 1. The cell thus constructed is also similar to that shown in FIG. 2. In this example, the reference numeral 5 of FIG. 2 represents the electrode of this invention, and the reference numeral 8 denotes potassium hydroxide with a specific gravity of 1.32 containing 2% of hydrazine, which is circulated in such a direction as $8' \rightarrow 8 \rightarrow 8''$. The reference numeral 6 indicates the hydrazine electrode formed of a sintered nickel body having platinum added thereto as catalyst as well known in the art. Assume that $(A)_2$ is the cell using the electrode of this invention, that $(B)_2$ is a cell having a polyamide cloth with polyvinyl alcohol impregnated therein interposed between the hydrazine electrode and the air electrodes as in the conventional case thereby preventing the diffusion of hydrazine to the air electrode, and using as the air electrode an electrode having no such layer as provided in the cell of this invention, and that $(C)_2$ is a cell using an electrode similar to that used in (B) and having the separator removed. These three cells were continuously discharged at a current density of 50 mA/cm$^2$. FIG. 3 shows the current-voltage characteristics of the respective cells which were obtained after a lapse of 500 hours from the start of the continuous discharge. The curve $B_2$ shows the case where the electrolyte between the separator and the air electrode of the cell $(B)_2$ had been replaced with a potassium hydroxide solution containing no hydrazine at the point of time 3 hours prior to the measurement, and the curve $B_2'$ shows the result obtained prior to said replacement. In the case of the curve $B_2'$, 100 hours had lapsed from said liquid replacement. The curve $C_2$ shows the case of the cell $(C)_2$. In this case, a very bad characteristic was obtained since hydrazine directly reached the electrode surface to represent a potential corresponding to the mixture of hydrazine and oxygen. From these results, it has been found that the cell $C_2$ cannot be applied for practical use, and that with the cell $B_2$ it is required that a potassium hydroxide solution containing no hydrazine be always supplied between the separator and the air electrode. It has also been found that the cell $(A)_2$ embodying this invention represents the most excellent discharge performance as shown by the curve $A_2$. As a result of separate investigations, the utilization rate of hydrazine of the cell $(A)_2$ was about 88% for the case where the quantity of hydrazine contained in the electrolyte was 2%, that of the cell $(B)_2$ was 86%, and that of the cell $(C)_2$ was 35%. In this example, a case is described, where a layer comprising nickel oxide and fluorocarbon resin is provided after subjecting to a water-proof treatment with a fluorocarbon emulsion. A stronger layer can be formed by substituting the above method with such as heat treatments for water-proofing, layer formation and water-proofing or heat treatments for water-proofing, layer formation and further layer formation.

EXAMPLE 3

In this example, this invention was applied to the hydrogen electrode of an oxygen-hydrogen fuel cell.

A sintered nickel body with a porosity of 84% and a thickness of about 1.2 mm was prepared by a conventional method. On the liquid side of the sintered body thus prepared was uniformly applied a mixture prepared by dispersing 6 parts of a mixture of 78% of aluminum oxide and 22% of fluorocarbon oxide in a solution prepared by dissolving 0.5 parts of polystyrene in 8 parts of benzene, at a rate of 10–40 mg/cm$^2$ when dried. Thereafter, the sintered body was subjected to heat treatment in nitrogen at 320°C. for one hour, and then a mixture of platinum and palladium at the ratio of 1:1 was added to the sintered body as catalyst at a rate of 6 mg/cm$^2$, by a conventional method. Furthermore, the sintered body was subjected to water-proofing with polyethylene. On the gas side of the resulting electrode was provided a non-woven polypropylene cloth having a sufficient quantity of fluorocarbon resin powder attached thereto. Then, it was integrally pressed with a pressure of about 50 kg/cm² which is much lower than that at which the conventional carbon electrode is press-molded. As a result of investigations of the abilities of the hydrogen electrode of the electrode $(A)_3$ of this invention and an electrode $(B)_3$ produced by the same method as that of the electrode $(A)_3$ but having no layer provided on the liquid side for comparison, it has been found that in the electrode $(B)_3$, the hydrogen gas is caused to permeate into the electrolyte due to high porosity thereof even if a low pressure is applied thereto for the purpose of supplying the hydrogen gas, while in the electrode $(A)_3$ embodying this invention no such phenomenon occurs and a good discharge performance was obtained. That is, if a very minute layer is provided on the side where the gas is supplied, the supply of the gas to the reaction portion may be interrupted during discharge of the cell, whereas such layer may be provided on the liquid side since it is only required that the electrolyte be caused to reach the reaction surface of the electrode. This means that the distribution of the pores in the layer to be provided on the liquid side is essentially different from that on the gas side. That is, it is in that portion of the electrode which is associated with the gas that a high porosity is required. Comparision of the discharge characteristics of the electrode $(A)_3$ with that of the electrode $(B)_3$ shows that there is little or no difference therebetween. In this example, the most significant effect of the layer provided on the liquid side of the electrode is to diminish the supplied gas such as hydrogen gas from permeating into the electrolyte.

As will be appreciated from the foregoing three examples, the high-porosity layer of which the main constituent is nickel provided on the liquid side of the electrode serves to diminish liquid leakage, adverse effect of an active liquid fuel, permeation of the gas into the electrolyte, etc. Thus, it is essential that the layer meet the aforementioned five requirements, and that above all it be inactive with respect to the fuel, having no adverse effect on the water-proofing ability of the oxygen electrode and being rigidly fixed. For such purposes, graphite, nickel oxide, aluminum oxide or the like can most advantageously be used as the powder, and fluorocarbon resin as the binding agent, as described in the foregoing examples. As the binding agent, use may also be made of polyethylene, polyvinyl chloride or the like. The addition of a small quantity of the binding agent to the electrode surface produces a satisfactory effect, and such quantity may be 7–50 mg/cm², preferably 10–40 mg/cm². As described above, the gist of this invention resides in the provision of the aforementioned layer on the liquid side of the high-porosity electrode of which the main constituent is nickel. Preferably, however, fluorocarbon resin powder may be applied on the gas side of the electrode as disclosed in Examples 1 and 2, or such synthetic fiber cloth as described in Example 2 may be integrally provided on the layer, thereby increasing the life span of the electrode and improving the ability of the layer to diminish liquid leakage.

What is claimed is:
1. A battery comprising:
   a gas diffusion electrode, said electrode comprising:
      a high porosity sintered metallic body, said body having nickel as its main constituent,
      a first layer affixed to one side of said sintered body, said first layer consisting essentially of: a powder-like, alkali-resistive material which is catalytically inert with respect to fuel, and a synthetic resin binder agent;
   an electrolyte in contact with said first layer of said gas diffusion electrode; and
   means for supplying a gas on the other side of the sintered body of said gas diffusion electrode.
2. The battery of claim 1 wherein said first layer consists essentially of a synthetic resin binder agent and a powder selected from the group consisting of graphite powder, nickel oxide powder and aluminum oxide powder.
3. The battery of claim 1 which further comprises a second layer interposed between said sintered body and the path of gas from said gas supply means, said second layer consisting essentially of a water-repellent fluorocarbon resin bonded to the other side of said sintered body.
4. The battery of claim 2 wherein the powder selected from the group consisting of graphite powder, nickel oxide powder and aluminium oxide powder has a grain diameter not greater than 40 microns.
5. The battery of claim 2 wherein said first layer consists of 10–40 mg/cm² of said powder and 10–40 weight per cent of said synthetic resin binder agent with respect to the weight of said powder.
6. The battery of claim 3 which further comprises a second layer interposed between said sintered body and the path of gas from said gas supply means, said second layer consisting essentially of a water-repellent fluorocarbon resin bonded to the other side of said sintered body.

* * * * *